United States Patent [19]

Williams

[11] Patent Number: 4,722,067
[45] Date of Patent: Jan. 26, 1988

[54] METHOD AND APPARATUS FOR IMPLEMENTING MODULO ARITHMETIC CALCULATIONS

[75] Inventor: Tim A. Williams, Austin, Tex.

[73] Assignee: Motorola, Inc., Schaumburg, Ill.

[21] Appl. No.: 715,865

[22] Filed: Mar. 25, 1985

[51] Int. Cl.$^4$ ............................................. G06F 7/72
[52] U.S. Cl. .................................................. 364/746
[58] Field of Search ....................................... 364/746

[56] References Cited

U.S. PATENT DOCUMENTS

| | | | |
|---|---|---|---|
| 3,980,874 | 9/1976 | Vora | 364/746 |
| 4,187,549 | 2/1980 | Bond et al. | 364/746 |
| 4,598,266 | 7/1986 | Bernardson | 364/746 |

OTHER PUBLICATIONS

"DSP Microprocessor ADSP-2100", Analog Devices Inc., pp. 1-35, Aug. 1986.
Roesgen et al., "Moving Memory Off Chip, DSP μP Squeezes in More Computation Power", *Electronic Design*, pp. 131–140, Feb. 20, 1986.
Garde et al., "16–Bit-Slice Family Creates Ultrafast Digital Signal Processors", *Electronic Design*, May 17, 1984, pp. 136–144.
Raminarayan, "Practical Realisation of mod, p,p Prime Multiplier", *Electronics Letters*, Jun. 5, 1980, vol. 16, No. 12, pp. 466-467.

*Primary Examiner*—David H. Malzahn
*Attorney, Agent, or Firm*—John A. Fisher; Jeffrey Van Myers; Robert L. King

[57] ABSTRACT

A modulo arithmetic unit and method for providing a sum of first and second numbers is provided. In one form, a first adder calculates a first sum which is equal to the arithmetic sum of the first and second numbers. A second adder is provided for adding the first number to an offset value equal to $(2^X - M)$, where X defines the number of bits of the number system used, M is a predetermined modulus and X and M are integers. A third adder operates in parallel with the first adder to calculate the sum of the output value of the second adder and the second operand to provide a second output sum and a carry output bit. In another form, only two adders are utilized wherein the first adder calculates a first output sum of the first and second numbers, and the second adder calculates the sum of the first output sum and the offset value. Both illustrated forms utilize a multiplexer which outputs one of the two calculated output sums depending upon whether a wraparound of an upper modulus boundary occurred.

8 Claims, 2 Drawing Figures

1

METHOD AND APPARATUS FOR IMPLEMENTING MODULO ARITHMETIC CALCULATIONS

CROSS REFERENCE TO RELATED APPLICATIONS

Related subject matter can be found in the following copending applications, each of which is assigned to the assignee hereof:

1. Application Ser. No. 06/715,864, entitled, "A Modulo Arithmetic Unit Having Arbitrary Offset And Modulo Values", filed simultaneously herewith by Kevin Kloker et al.

2. Application Ser. No. 06/715,863, entitled, "A Data Processor Execution Unit", filed simultaneously herewith by Kevin Kloker.

TECHNICAL FIELD

This invention relates generally to modulo arithmetic, and more particularly, to an arithmetic unit for implementing modulo arithmetic.

BACKGROUND ART

Digital filters are commonly implemented by time division multiplexed sections in which each section is essentially identical in function. In such applications, it is advantageous to make the control of the filter parameters independent between the sections. In time division multiplexing applications, significant savings in circuitry can be realized by using modulo arithmetic to implement the addressing requirements of the sections. Circular buffers or queues are commonly used to implement a predetermined section of a filter. Modulo arithmetic may be used with circular buffers to implement addresses for other sections of the filter. Therefore, a large number of addresses may be effected with substantial savings of circuitry as compared with linear addressing methods. As a result, control overhead is simplified. Others have commonly implemented modulo addressing in software for effecting a predetermined string of increments. Others have also chosen not to use modulo addressing and have implemented addressing with straight line coding or circuitry. A disadvantage with previous modulo addressing implementations is the requirement of multiple add cycles and the necessity for comparison registers to determine whether boundary values are exceeded.

SUMMARY OF THE INVENTION

Accordingly, an object of the present invention is to provide an improved method for implementing modulo arithmetic calculations.

Another object of the present invention is to provide an improved modulo arithmetic unit for implementing modulo arithmetic calculations.

In carrying out the above and other objects of the present invention, there is provided, in one form, a modulo M arithmetic unit for providing a sum of first and second numbers. The first and second numbers are integers of a number system having X bits and being within a predetermined range having an upper and a lower boundary relative to M, where M is a selected one of a plurality of predetermined modulae. Both M and X are integers. In one form, a first adder selectively adds the first and second numbers to provide a first output sum. A second adder, adder selectively receives and adds the first output sum and an offset value. The offset value is equal to $(2^X - M)$. The second adder provides a second output sum and a control signal. A control logic portion provides one of the two sums in response to the control signal as an output sum having a value which is within the predetermined range.

In another form, a first adder is provided for adding the first number and the offset value to provide an intermediate modulo value. A second adder selectively receives and adds the intermediate modulo value and the second number to provide a first output sum and a control signal. A third adder is provided for adding the first and second numbers to provide a second output sum. A logic portion which is coupled to the first and second output sums provides, in response to the control signal, a selected one of the first or second output sums as the sum of the first and second numbers having a value within the predetermined range. The above and other objects, features and advantages will be more clearly understood from the following detailed description taken in conjunction with the accompanying drawings.

DETAILED DESCRIPTION OF THE INVENTION

Figure 1:
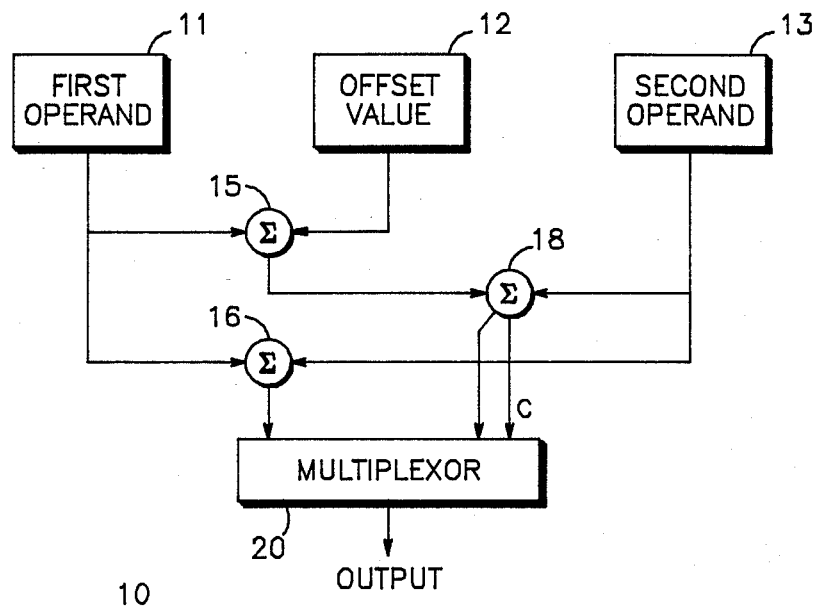
FIG. 1 illustrates in block diagram form a modulo arithmetic unit in accordance with one form of the present invention.

Shown in FIG. 1 is a modulo M arithmetic unit 10 for adding first and second operands modulo M, where M is an integer. The modulus M is a predetermined one of a plurality of modulae and contains numbers within a range having a lower boundary and an upper boundary. In the illustrated implementation of the present invention, the lower boundary value is assumed to be zero.

A first operand storage device 11 is provided for storing the first operand which is an arbitrary number in a number system having X bits, where X is an integer. An offset value storage device 12 is provided for storing a precalculated offset value which equals $(2^X - M)$. A second operand storage device 13 is provided for storing the second operand which is also an arbitrary number in the modulo M, X-bit number system. An output of storage device 11 is connected to both a first sum input of an adder 15 and a first sum input of an adder 16. An output of storage devie 12 is connected to a second sum input of adder 15, and an output of adder 15 is connected to a first sum input of an adder 18. An output of storage device 13 is connected to both a second sum input of adder 18 and a second sum input of adder 16. A sum output of adder 16 is connected to a first input of multiplexer 20, and a sum output of adder 18 is connected to a second input of multiplexer 20. A carry output of adder 18 is connected to a control input of multiplexer 20 labeled "C". An output of multiplexer 20 provides the sum of the first and second operands modulo M where the sum value is a valid number within the range of the modulus even if the sum has exceeded an upper boundary.

In operation, a number system having a predetermined integer number, X, of bits is initially chosen. When calculating the sum of two numbers in a modulus, it is possible that a resulting sum value exceeds an upper boundary value of the modulus. The sum must be wrapped back around to the lower boundary value of the modulus and a value with the modulus provided. The present invention provides the addition of two numbers relative to a predetermined modulus by using adders 16 and 18 in parallel with the carry bit output of adder 18 functioning as a control signal to select one of the outputs of adders 16 and 18. Depending upon the values of the first and second operands and the modulus, the output of adder 16 may exceed the upper boundary of the modulus. By first adding an offset value to the first operand to provide an intermediate modulo value and then adding the intermediate modulo value to the second operand, a sum is provided which effectively wraps around the upper boundary of the modulus. Therefore, the X bits of the resulting sum remain within the range of the numbers of the modulus. An easy determination of whether a wraparound of an upper boundary occurs is provided by the state of a carry output bit at the output of adder 18. If a wraparound of an upper boundary exists, the carry output bit of adder 18 will be a logic one value and will control multiplexer 20 to provide the output of adder 18 as the correct sum value. If a wraparound of an upper boundary has not occurred, the carry output bit at the output of adder 18 will be a logic zero value and will control multiplexer 20 to provide the output of adder 16 as the correct sum value. Multiplexer circuit 20 is a conventional multiplexer, and it should be obvious that the function of multiplexer 20 may be implemented with numerous other logic circuits such as with a tri-state enabled output cirucit. Storage devices 11, 12 and 13 may each also be implemented in a variety of possible ways such as with a register or with a counter circuit such as an up/down circuit.

In the illustrated form, an example illustrating the sum of two operands when a wraparound occurs and when a wraparound does not occur will make the operation of modulo arithmetic unit 10 more apparent. Assume for the purpose of illustration only that the numbers "three" and "five" are to be added modulo seven and the chosen number of bits in the system to be implemented is four. In this example, a wraparound of the upper boundary of six will occur since (3+5) Modulo 7 equals 1. Adder 16 will add three and five in binary arithmetic and output the value of eight (1000) which is stored by mutliplexer 20. Near simultaneously, adder 15 will add three with the offset value. The offset value is equal to ($2^4-7$) or nine. The output of adder 15, the intermediate modulo value, is equal to twelve (1100). Adder 18 then adds the second operand value five to twelve and the result is seventeen (10001) where the sum output of adder 18 is (0001) and the carry output bit is a binary one. The binary one state of the carry output controls multiplexer 20 to output the result of adder 18 as the correct sum output.

Similarly, if the numbers "four" and "two" are to be added in modulus seven where a four bit number system is implemented, the result should be six since (4+2) Modulo 7 equals six and no wraparound of the upper boundary will occur. To verify the operation of modulo arithmetic unit 10, the output of adder 16 is six (0110). Near simultaneously, the intermediate modulo value is calculated and coupled to adder 18 where the second output sum is calculated. The output of adder 15 equals four plus nine or thirteen (1101). Therefore, adder 18 calculates the sum of thirteen and two which equals fifteen (01111) where the sum output of adder 18 equals (1111) and the carry output bit is a binary zero. Since the carry output bit of adder 18 is zero, multiplexer 20 outputs the sum of adder 16 as the correct valued output. It should be noted that arithmetic unit 10 must function with input operands which are elements of the set of numbers contained within a modulo M number system. However, this is typically not an important limitation.

Figure 2:
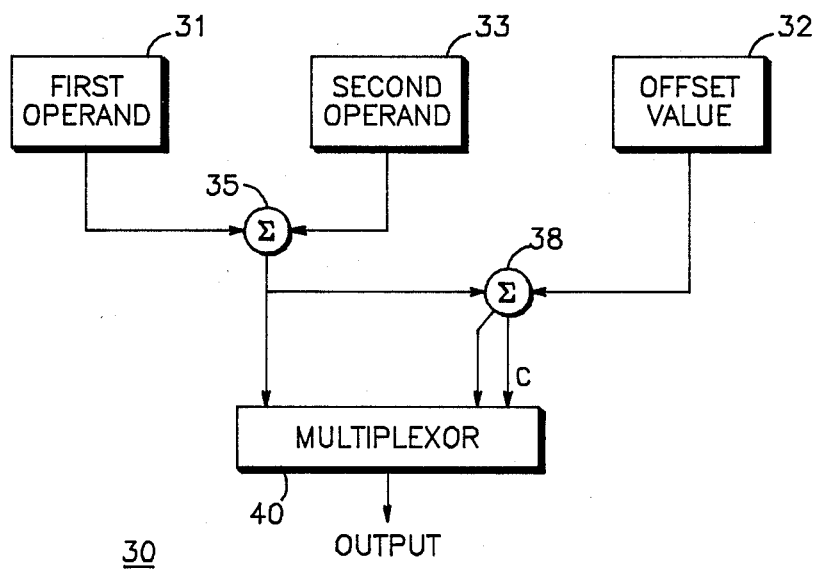
FIG. 2 illustrates in block diagram form a modulo arithmetic unit in accordance with another form of the present invention.

Shown in FIG. 2 is a modulo arithmetic unit 30 which illustrates another form of the present invention. A first operand storage device 31 is provided for storing a first operand. An offset value storage device 32 is provided for storing an offset value, and a second operand storage device 33 is provided for storing a second operand. An output of first operand storage device 31 is connected to a first sum input of an adder circuit 35, and an output of second operand storage device 33 is connected to a second input of adder 35. A sum output of adder 35 is connected to both a first input of an adder circuit 38 and to a first input of a multiplexer circuit 40. An output of offset value storage device 32 is connected to a second input of adder 38. A sum output of adder 38 is connected to a second input of multiplexer 40, and a carry output of adder 38 is connected to a control input of multiplexer 40 labeled "C". An output of multiplexer 40 provides a sum output of the first and second operands having a modulus of M.

In operation, a number system having X bits is again chosen. Adders 35 and 38 respectively calculate a linear and a modulo sum of the first and second operands. The output sum of adder 38 provides a value of the sum offset by the modulus to provide a sum which assumes that a wraparound of an upper boundary occurred. The carry output of adder 38 is used as a control signal which indicates whether or not a wraparound occurred and which selects the output of either adder 35 or adder 38 as the correct sum output.

An example illustrating the sum of operands when a wraparound occurs and when a wraparound does not occur will make the operation of modulo arithmetic unit 30 more apparent. Again assume that the numbers "three" and "five" are to be added in modulus seven and the chosen number of bits in the system to be implemented is four. Adder 35 adds the operands and provides the sum of "eight" or 1000. The offset value which is stored in offset value storage device 32 is equal to ($2^4-7$) or nine. Adder circuit 38 adds (8+9) to provide an output sum of "seventeen" which is 10001. In other words, the output carry bit of adder 38 is "1" and the output sum is 0001. In response to the output carry bit of adder 38, multiplexer circuit 40 provides the output of adder 38 as the proper output sum indicating that a wraparound of the upper boundary value of six in modulo seven occurred.

Similarly, if the numbers four and two are to be added in modulus seven in the same four bit number system, the result should be six and no wraparound of an upper boundary exists. Therefore, the output sum of adder 35 should be provided by multiplexer 40. To verify the arithmetic operation, adder 35 provides the sum of "six" or 0110. The offset value which is stored in storage device 32 is equal to ($2^4-7$) or "nine". Therefore, the sum calculated by adder 38 is equal to "fifteen" or 01111 where the output carry bit is equal to "zero" and the output sum is 1111. Since the output carry bit of adder 38 is equal to "zero", multiplexer 40 provides the output sum from adder 35 as the correct output sum.

In the illustrated forms, either arithmetic unit 10 or 30 may be the most preferably implementation of the present invention depending upon specific design criteria desired. The circuit of FIG. 2 only requires two adder circuits as opposed to three adder circuits utilized by arithmetic unit 10. However, arithmetic unit 30 is typically slower than arithmetic unit 10 because the sum output of adder 35 must first be calculated before the sum provided by adder 38 may be calculated. Whereas, in arithmetic unit 10, if the first operand is chosen to be relatively constant and the second operand is constantly varied, the propagation delay in arithmetic unit 10 is primarily limited to only the delay of adder 18. For example, in implementing a predetermined section of a filter, the first operand may have a relatively constant value representing a predetermined section of a filter. If the value of the first operand changes slowly in comparison with the value of the second operand, the resulting arithematic calculation speed is improved because the intermediate modulo value is already provided to adder 18 when the second operand is initially available. The adder circuits illustrated in FIGS. 1 and 2 may be implemented by conventional full adder circuits or by other types of adder circuits, and the present invention is not limited to any particular type of adder circuit.

By now it should be apparent that a modulo arithmetic unit which quickly provides a correct modulo sum value has been described. Arithmetic unit 10 is useful for implementing algorithms which depend on modulo calculations. The present invention implements what is typically accomplished by extensive software routines augmented with a small amount of hardware. It should also be understood that the present invention requires that the system bit size be wide enough that the operand width size of adders 15 and 35 is wide enough to accomodate any possiblity of an adder overflow resulting from the respective additions associated therewith. While specific embodiments have been taught, it should be understood that certain modifications to the circuit will become apparent to those skilled in the art, and the scope of the invention should be limited only by the scope of the claims appended hereto.

What is claimed is:

1. A modulo M arithmetic unit for providing a sum of first and second numbers, said numbers being integers of a number system having X bits and being within a predetermined range having an upper boundary and a lower boundary of zero relative to M, where M is a selected one of a plurality of predetermined modulae and M and X are integers, comprising:
    first adder means for selectively receiving and adding the first and second numbers to provide a first output sum;
    second adder means for selectively receiving and adding the first number and an offset value, said offset value being equal to $2^X - M$), and for providing an intermediate modulo value;
    third adder means for selectively receiving and adding the intermediate modulo value and the second number to provide a second output sum and an output carry bit; and
    logic means for providing, in response to a logic state of the output carry bit, a selected one of the first and second output sums as a sum of the first and second numbers which has a value within the predetermined range.

2. The modulo M arithmetic unit of claim 1 further comprising:
    first storage means coupled to the second adder means, for storing the first number;
    second storage means coupled to the second adder means, for storing the offset value; and
    third storage means coupled to the first and third adder means, for storing the second number.

3. The modulo M arithmetic unit of claim 1 wherein the logic means is a multiplexer circuit.

4. In combination in a system for adding first and second numbers in a predetermined modulus, said numbers being integers of a number system having X bits and being within a predetermined range having an upper boundary and a lower boundary of zero relative to M, where M is a selected one of a plurality of predetermined modulae, M and X being integers, a method comprising the steps of:
    providing first means for selectively adding the first and second numbers to provide a first output sum;
    providing second means for selectively adding the first number to an offset value, the offset value being equal to $(2^X - M)$, to provide an intermediate modulo value;
    providing third means for selectively adding the intermediate value and the second number to provide a second output sum and an output carry signal; and
    providing fourth means for selecting, in response to the output carry signal, one of the first or second output sums as a sum of the first and second numbers having a value within the predetermined range.

5. A modulo M arithmetic unit for providing a sum of first and second numbers, said numbers being integers of a number system having X bits and being within a predetermined range having an upper boundary and a lower boundary of zero relative to M, where M is a selected one of a plurality of predetermined modulae and M and X are integers, comprising:
    first adder means for selectively receiving and adding the first and second numbers to provide a first output sum;
    second adder means for selectively receiving and adding the first output sum and an offset value, said offset value being equal to $(2^X - M)$, and providing a second output sum and an output carry signal; and
    logic means coupled to the first and second adder means, for providing, in response to the output carry signal, a selected one of the first and second output sums as a sum of the first and second numbers which has a value within the predetermined range.

6. The modulo M arithmetic unit of claim 5 further comprising:
    first storage means coupled to the first adder means, for storing the first number;
    second storage means coupled to the first adder means, for storing the second number; and
    third storage means coupled to the second adder means, for storing the offset value.

7. The modulo arithmetic unit of claim 5 wherein the logic means is a multiplexer circuit.

8. In combination in a system for adding first and second numbers in a predetermined modulus, said numbers being integers of a number system having X bits and being within a predetermined range having an upper boundary and a lower boundary of zero relative to M, where M is a selected one of a plurality of predetermined modulae, M and X being integers, a method comprising the steps of:

providing first means for selectively adding the first number and an offset value equal to $(2^x - M)$ to provide a first output sum;

providing second means for selectively adding the first output sum to an off set value, the off set value being equal to $(2^x - M$, to provide a second output sum and an output carry signal; and providing third means which, in response to the output carry signal, select one of the first and second output sums as a sum of the first and second numbers having a value within the predetermined range.

* * * * *

UNITED STATES PATENT AND TRADEMARK OFFICE
CERTIFICATE OF CORRECTION

PATENT NO. : 4,722,067

DATED : January 26, 1988

INVENTOR(S) : Tim A. Williams

It is certified that error appears in the above-identified patent and that said Letters Patent is hereby corrected as shown below:

In claim 1, at column 5, line 54, change "$2^X$-M)" to --($2^X$-M)--.

In claim 8, at column 7, line 2, delete "number and an offset value equal to ($2^X$-M)" and insert --and second numbers--; and In claim 8, at column 7, line 6, change "($2^X$-M" to --($2^X$-M)--.

Signed and Sealed this

Twenty-first Day of June, 1988

Attest:

DONALD J. QUIGG

*Attesting Officer*  *Commissioner of Patents and Trademarks*